(12) United States Patent
Mischler

(10) Patent No.: US 7,534,078 B1
(45) Date of Patent: May 19, 2009

(54) CONSISTENT RIGIDITY CONSTRUCTION ARRANGEMENT FOR A MACHINE TOOL

(75) Inventor: Peter L. Mischler, Rockton, IL (US)

(73) Assignee: Cincinnati Machine, LLC, Hebron, KY (US)

( * ) Notice: Subject to any disclaimer, the term of this patent is extended or adjusted under 35 U.S.C. 154(b) by 0 days.

(21) Appl. No.: 12/107,257

(22) Filed: Apr. 22, 2008

(51) Int. Cl.
*B23C 1/027* (2006.01)

(52) U.S. Cl. .................................. 409/235; 408/234

(58) Field of Classification Search .............. 409/235, 409/183, 185, 189, 204, 206; 408/234
See application file for complete search history.

(56) References Cited

U.S. PATENT DOCUMENTS

| | | | |
|---|---|---|---|
| 2,564,180 A * | 8/1951 | Turrettini | 409/235 |
| 3,800,636 A * | 4/1974 | Zagar | 408/234 |
| 5,252,011 A * | 10/1993 | Corsi | 409/235 |
| 5,394,604 A * | 3/1995 | Corsi | 409/235 |
| 5,938,577 A * | 8/1999 | Lindem | 409/235 |
| 6,113,324 A * | 9/2000 | Huber | 409/235 |
| 6,161,995 A * | 12/2000 | Wakazono et al. | 409/235 |
| 6,273,653 B1 * | 8/2001 | Horn et al. | 409/235 |
| 6,582,278 B1 * | 6/2003 | Kroll et al. | 409/235 |
| 2003/0190206 A1 * | 10/2003 | Sugata et al. | 409/235 |
| 2006/0260907 A1 | 11/2006 | Ota | |

FOREIGN PATENT DOCUMENTS

DE 19645324 A1 * 5/1998
EP 816012 A1 * 1/1998

OTHER PUBLICATIONS

Machine Translation of DE 19645324.*

* cited by examiner

*Primary Examiner*—Erica E Cadugan
(74) *Attorney, Agent, or Firm*—Reising Ethington P.C.

(57) ABSTRACT

The frame of a machine tool forms a closed force loop design that surrounds a workzone containing the spindle head. The X and Y-axis drive motors are mounted on stationary elements of the machine. The Y-axis column is fixed, and supports a Z-axis ram. The mounting and positioning of the Z-axis ram minimizes the change in droop and the effects of acceleration forces on the Z-axis structure. The X, Y, and Z-axis drive motors are all mounted outside of the workzone to shield them from contamination and debris generating during the machining process, and for ease of maintenance.

10 Claims, 7 Drawing Sheets

CONSISTENT RIGIDITY CONSTRUCTION ARRANGEMENT FOR A MACHINE TOOL

FIELD OF THE INVENTION

A machine tool has a closed force loop design, a fixed bifurcated Y-axis column, and a Z-slide design that optimizes the consistency of the rigidity of the machine.

BACKGROUND OF THE INVENTION

A plate mill is a type of machine tool that is used to machine large flat workpieces having a substantial length and width, but relatively little height. Because the workpiece is large, the plate mill itself is relatively large, and in large machines, rigidity and the ability to resist deformation during operation are important design considerations. In machine tools that use a Z-axis ram, it is important to keep the center of gravity of the ram as close as possible to the suspension points for the ram to minimize the effects of acceleration forces that occur during machine operation. It is also important in high performance machines that the rigidity of the machine remain as constant as possible throughout the working envelope of the machine. This allows for optimal process parameters to be utilized throughout the envelope instead of having to vary the process parameters depending on workpiece location in the workzone. In high speed machining there are stability lobes where based on the cutter tooth pass frequency and the rigidity of the system greater metal removal rates can be achieved without chatter. These stability lobes exist in fairly narrow ranges and changes in system stiffness within the work envelope can cause parameters that allow chatter free cutting in one area to cause chatter in another.

BRIEF SUMMARY OF THE INVENTION

The frame of a machine tool is configured to form a closed force loop design that surrounds a workzone containing the spindle head. The front of the loop comprises a fixed Y-axis bifurcated column and the back of the loop comprises a fixed X-axis frame. The top and bottom of the loop is formed by structural tubes that tie the Y-axis column and the X-axis frame together. A pallet receiver that supports the workpiece is mounted to move on X-axis rails. A vertically movable saddle is mounted near the center of Z-axis stroke on the Y-axis column and carries a Z-axis slide. The support of the saddle on the Y-axis column and of the Z-axis slide on the saddle maintains the load path for the working tool relatively constant throughout its stroke, and adds to the rigidity of the machine.

The X, Y, and Z-axis drive motors are all mounted outside of the workzone. The X-axis drive is mounted on a fixed wall that is attached to an X-axis frame member. The Y-axis drive is mounted on the fixed Y-axis column on the side of the Y-axis column that is opposite the workzone. The Z-axis drive is mounted on a saddle on the opposite side of the Y-axis column from the workzone. The positioning of the X and Y-axis drives on a stationary part of the machine adds to the rigidity of the machine, and eliminates the need for flexible cables to power and control these drives.

DETAILED DESCRIPTION OF THE INVENTION

Figure 1:
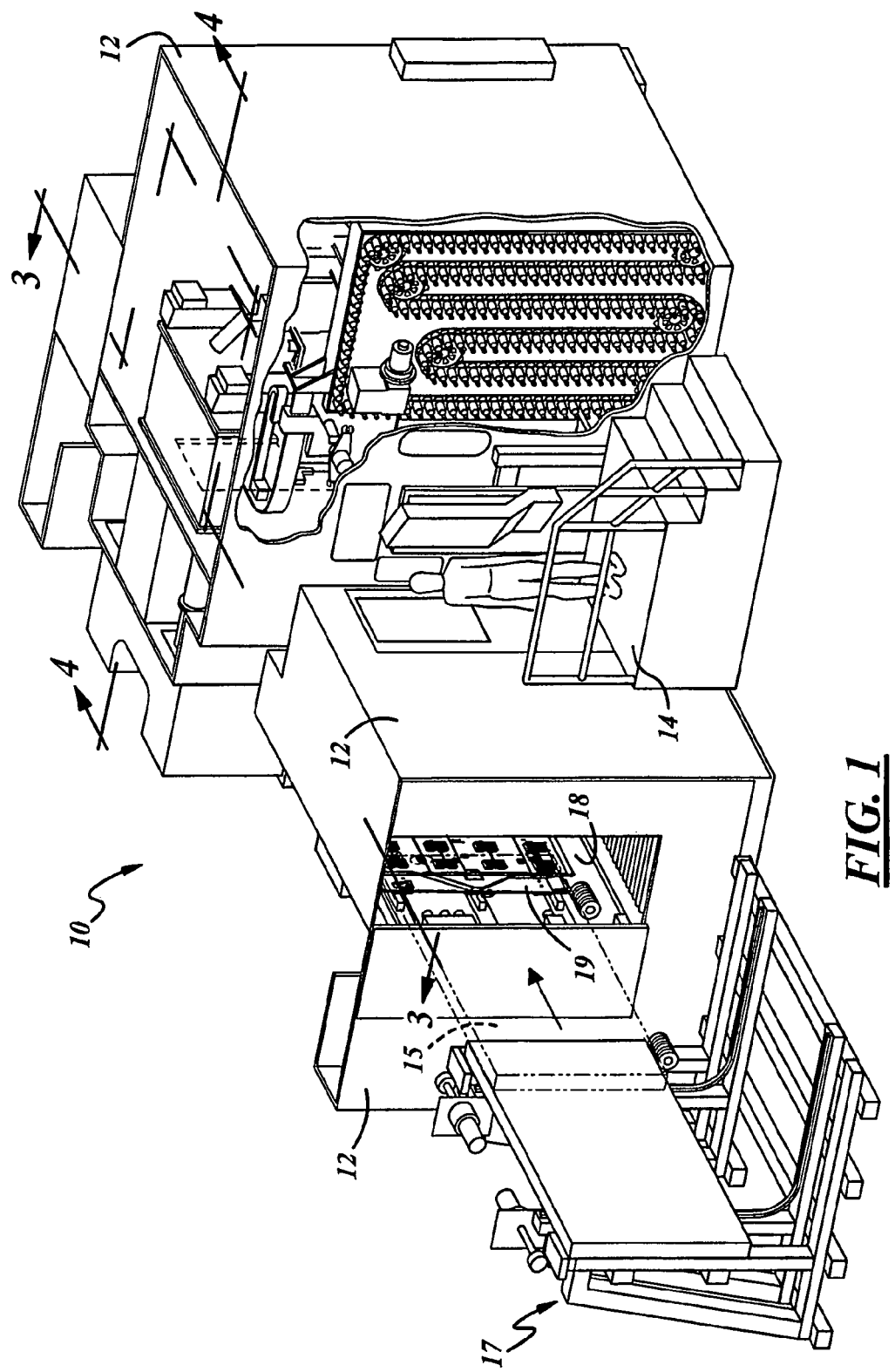
FIG. 1 is a perspective view of a machine tool according to the invention.

FIG. 1 shows a machine tool generally designated by the reference numeral 10. The machine tool is surrounded by standard guarding 12, and an operator station 14 is positioned outside of the guarding. The machine tool receives a pallet 15 with a workpiece from a pallet manipulator 17 that may be positioned adjacent to a pallet access opening 18 in the guarding. In operation, the pallet 15 is transferred from the pallet manipulator 17 to a pallet receiver 19 that is a part of the machine. The pallet receiver 19 is then driven to the working zone of the machine in front of the spindle and the working tool.

Figure 2:
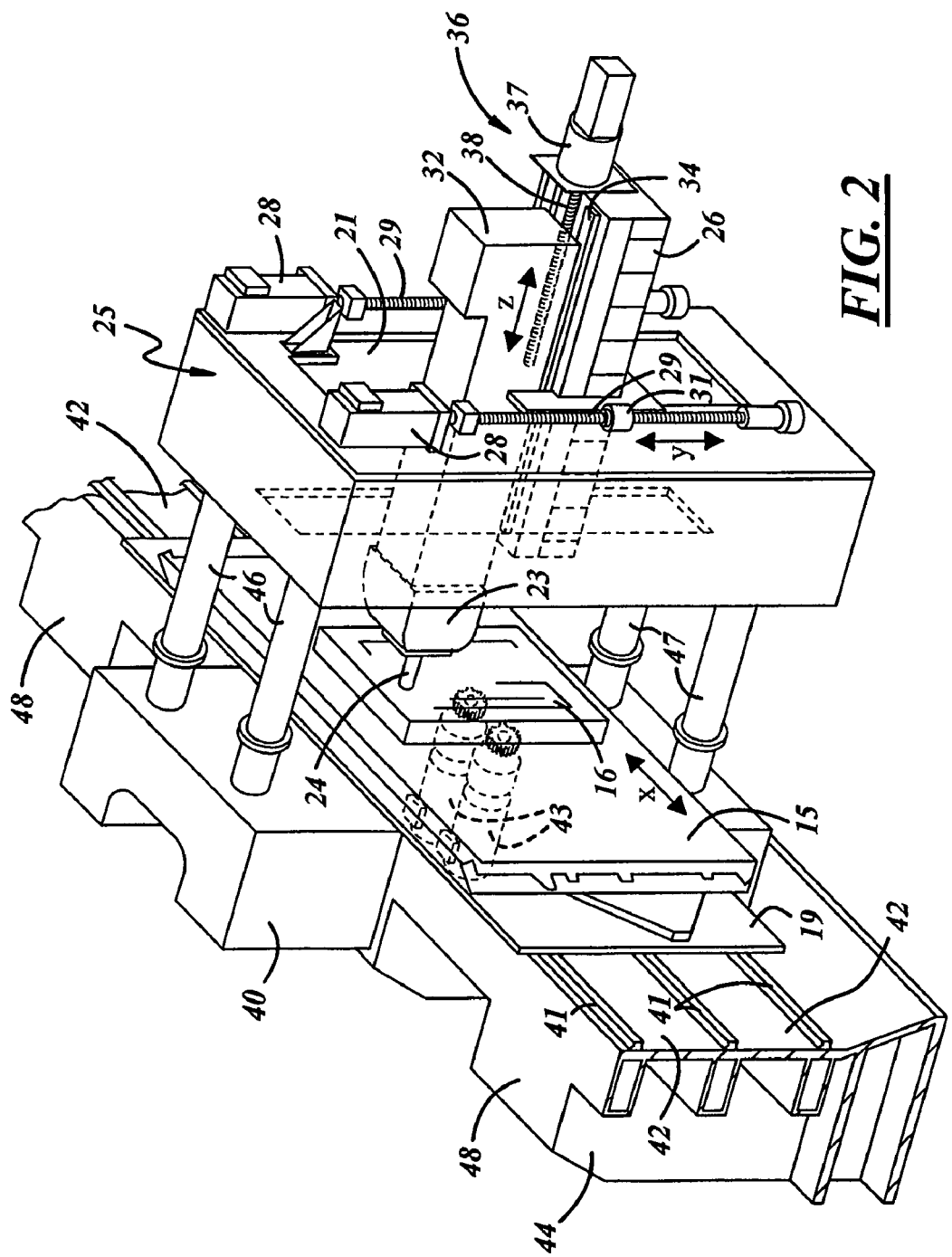
FIG. 2 is a simplified view of the X, Y, and Z-axis elements of the machine tool of FIG. 1.

FIG. 2 shows the X, Y, and Z-axis elements of the machine tool. The pallet 15 with a workpiece 16 is positioned in front of a spindle or multi-axis head 23 that carries the working tool 24 and this establishes a workzone. The Y-axis column 25 is fixed and is bifurcated. As shown in FIG. 2 and also in FIG. 3, the Y-axis column 25 carries a vertically movable saddle 26 that is mounted in a center opening 21 between the two sides of the bifurcated column 25 on vertical linear guides or ways 27 best seen in FIG. 3. Although not separately shown, feedback sensors for the vertical position of the saddle are also located adjacent to the ways 27. A servomotor 28 is mounted on each side of the Y-axis column 25, and each servomotor 28 is coupled to a drive screw 29. The drive screws 29 engage drive nuts 31 on opposite sides of the saddle 26, and the servomotors 28 are used to raise and lower the saddle to the desired vertical position.

The vertically movable saddle 26 carries a Z-axis slide 32. Bearings mounted on the Z-axis slide 32 support the slide on bearing ways 34 that are mounted on the saddle. A Z-axis drive assembly 36 comprises a servomotor 37 and a drive screw 38 that are mounted on the saddle 26. The Z-axis drive assembly 36 may be selectively controlled to position the Z-axis slide 32 and the working tool 24 in the desired position along the Z-axis. As used herein, the term Z-axis slide is used to designate a structure in which the bearings are mounted on the slide 32 and the bearing ways 34 are mounted on the saddle 26. This is to distinguish the structure from a Z-axis ram in which the bearings are mounted on the saddle and the ways are mounted on the ram.

X-axis frame members 40 and 44 support an X-axis wall 42, and a plurality of X-axis rails 41 are mounted on the X-axis wall 42. The pallet receiver 19 is mounted on the X-axis rails 41 for horizontal movement along the X-axis. One or more X-axis drive motors 43 shown in phantom are mounted on the X-axis wall 42 to drive the pallet receiver back and forth along the X-axis rails. The X-axis frame member 40 is coupled to the Y-axis column 25 by upper and lower tubular frame members 46 and 47, respectively, to form a rigid closed force loop design.

Figure 3:
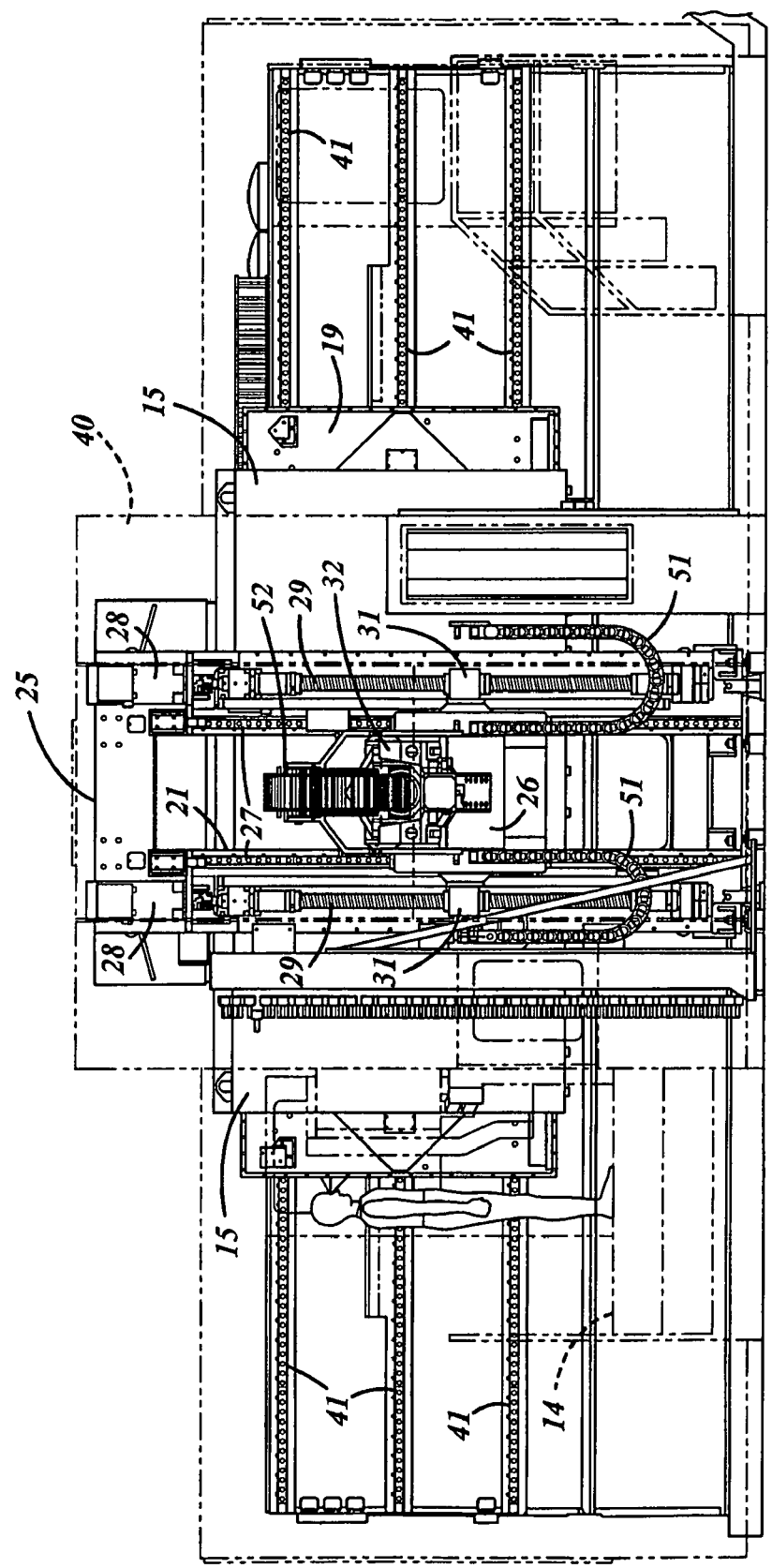
FIG. 3 is a sectional view of the machine tool taken along lines 3-3 of FIG. 1.

FIG. 3 is a sectional view of the machine tool taken along lines 3-3 of FIG. 1 showing certain elements of the machine 10 in greater detail. Two Y-axis ways 27 that guide the vertical movement of the saddle 26 are positioned on the bifurcated column 25 on either side of the center opening 21. Two Y-axis flexible cable guides 51 are provided to carry electrical and hydraulic cables and the like from the stationary part of the Y-axis column 25 to the movable saddle 26. One or more Z-axis flexible cable guides 52 are provided to carry electrical and hydraulic cables from the saddle 26 to the Z-axis slide 32. FIG. 3 shows the X-axis rails 41 that extend from one side of the machine to the other to support the pallet receiver 19 and to position the pallet 15 in front of the working tool 24. In this view, the pallet 15 and the receiver 19 are centered in front of the Y-axis column 25.

Figure 4:
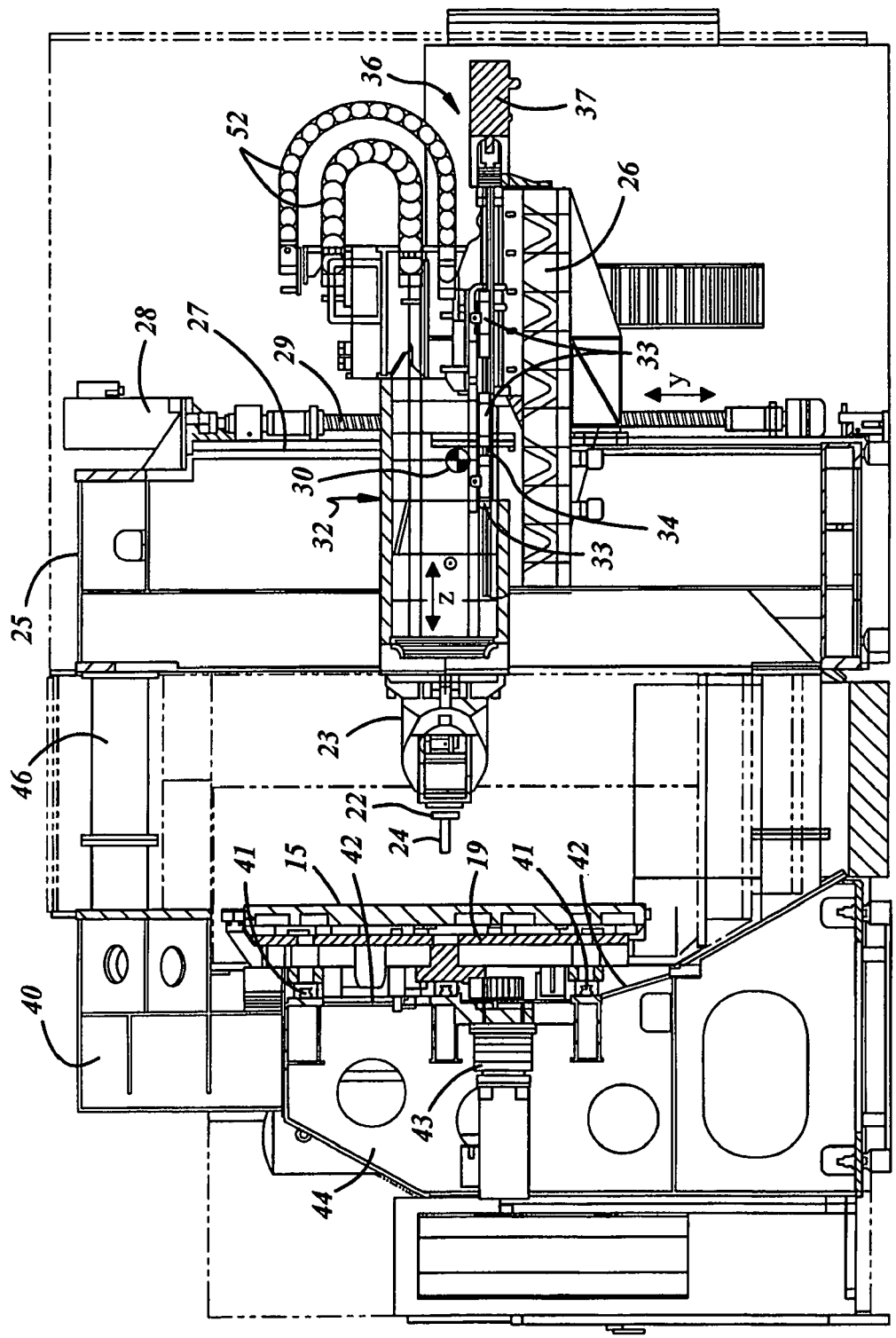
FIG. 4 is a side sectional view of the machine tool taken along lines 4-4 of FIG. 1.

FIG. 4 is a side sectional view of the machine tool taken along lines 4-4 of FIG. 1. FIG. 4 shows that the drive screws 29 that move and support the saddle 26 are positioned at approximately the midpoint of the saddle measured along the Z-axis. Allowing for the mass and overhang of the spindle head 23, this positioning of the drive screws 29 relative to the saddle 26 allows the center of gravity 30 of the combination of the saddle 26 and the Z-axis slide 32 to be maintained in relative proximity to the drive screws 29. On high acceleration and deceleration machines, the acceleration forces become a greater concern than the cutting forces. These forces can be considered to act at the center of gravity of the moving mass. The greater the distance from the center of gravity to the drive system, the greater the moment load that is added to the system and therefore the deflection caused during acceleration. The greater the distance from the center of gravity to the way system, the greater the moment that is exerted on the bearings, again causing greater deflection. The greater the distance from the feedback sensors to the drive system, the greater the Abbe Error (angular error) that will be seen in the linear feedback which will decrease the electronic stiffness of the servo system. The Z-axis slide 32 is fitted with bearing trucks or carriages 33 that ride on the ways 34 that are mounted on the saddle.

FIG. 4 shows the two Z-axis cable guides 52 that carry electrical and hydraulic cables from the saddle 26 to the Z-axis slide 32. FIG. 4 also shows the X-axis wall 42 that extends along the back of the workzone and is supported by the X-axis frame members 40 and 44. A plurality of X-axis rails 41 are mounted on the wall 42. The pallet receiver 19 is mounted on the X-axis rails 41 for horizontal movement along the X-axis. The X-axis drive motors 43 (only one shown) are used to drive the pallet receiver 19 back and forth along the X-axis rails 41.

The Z-axis slide 32 carries the spindle 22, the head 23, and the tool 24, and is movably mounted on the saddle 26 to travel in the Z-axis direction. Since the Z-axis slide 32 is relatively slender (its length is much greater than its width and height) and the working element or tool 24 overhangs from the support point of the bearing trucks or carriages 33 on the Z-axis slide on the ways 34, placing the Z-axis ways 34 on the saddle 26 and the bearing trucks or carriages on the Z-axis slide 32 causes the droop and stiffness of the constant overhang Z-axis slide to be more constant than with a conventional ram design in which the guide ways are mounted on the ram and the bearing trucks or carriages are mounted at a fixed location on the saddle. Drawing FIGS. 5-14 illustrate these principles and are explained in greater detail below.

Figure 5:
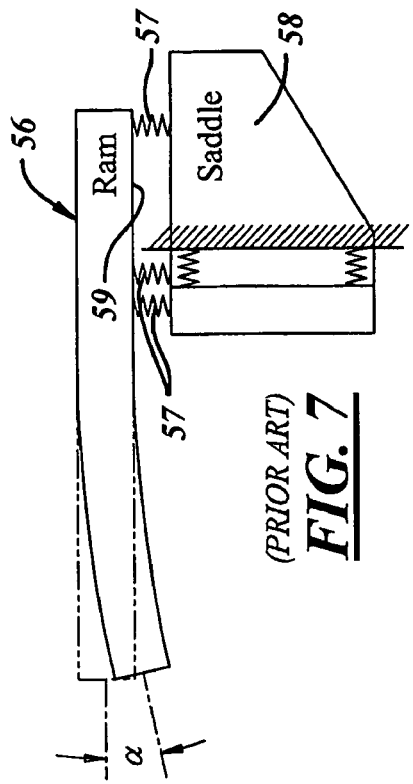
FIGS. 5 and 6 are graphical drawings showing a conventional suspension system for a Z-axis ram and the resulting load path.
Figure 6:
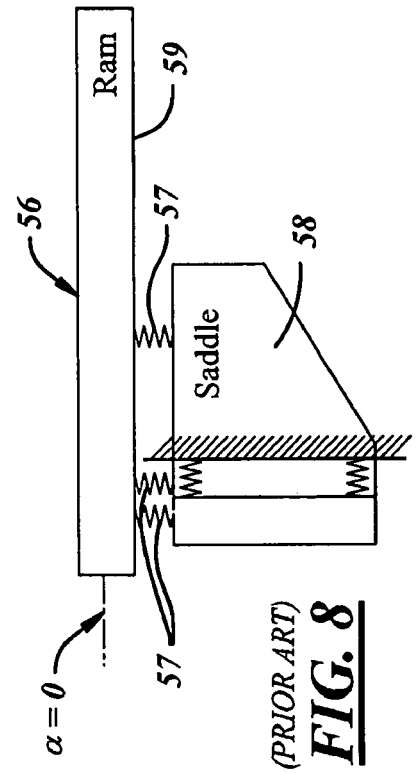

FIGS. 5 and 6 show the change in the load path 55 in a conventional ram 56 when the bearings 57 for the ram 56 are mounted on the saddle 58 and the ways 59 are mounted on the ram. FIG. 5 shows the ram 56 fully extended in the Z-axis direction. The length of the load path 55 measured from the midpoint 61 of the suspension point for the saddle 58 on the Y-axis ways 62 to the tip 63 of the ram 56 is nominally taken to be 1.0. FIG. 6 shows the ram 56 fully retracted. The length of the load path 55 measured from the midpoint 61 of the suspension point for the saddle 58 on the Y-axis ways to the tip 63 of the ram is 0.5, half the load path length shown in the configuration of FIG. 5.

Figure 7:
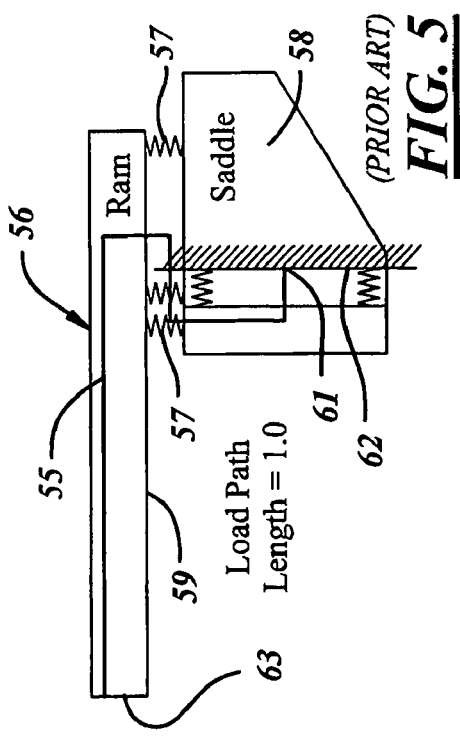
FIGS. 7 and 8 are graphical drawings showing the C-axis droop for the Z-axis ram of FIGS. 5 and 6.
Figure 8:
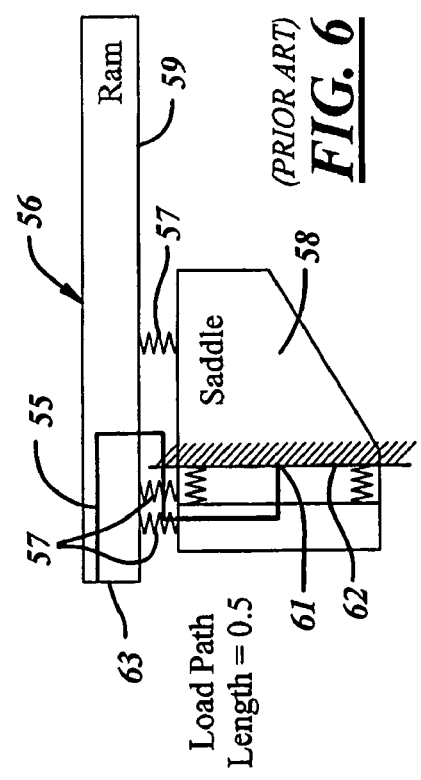

FIGS. 7 and 8 show how the angle or droop of the C-axis (the longitudinal axis of the ram 56) changes as the load path changes. In FIG. 7, with the ram 56 fully extended, the angle $\alpha$ of the C-axis is significant. In FIG. 8, with the ram 56 fully retracted, the angle $\alpha$ is zero. Thus, when using a ram with this design, the Z-axis ram stiffness and the C-axis angle vary with the position of the Z-axis ram 56 relative to the saddle 58.

Figure 9:
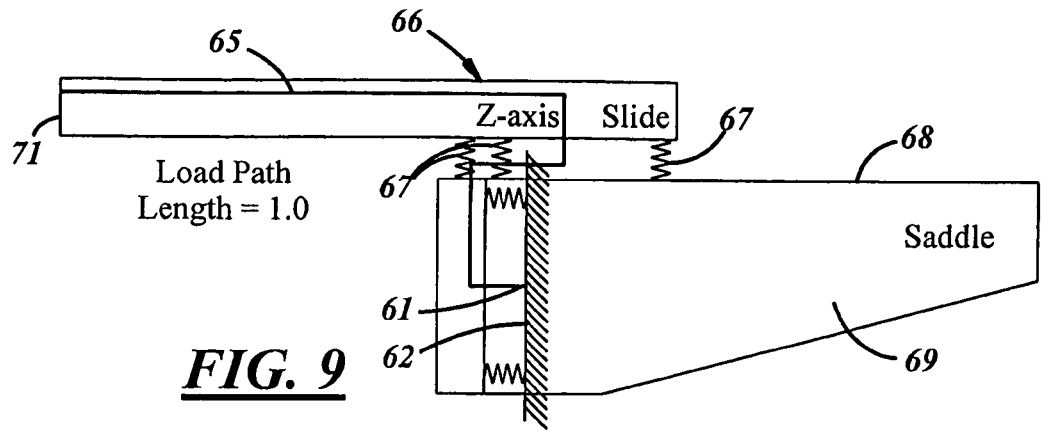
FIGS. 9 and 10 are graphical drawings showing a suspension system for a Z-axis slide with a front mounted saddle and the resulting load path.
Figure 10:
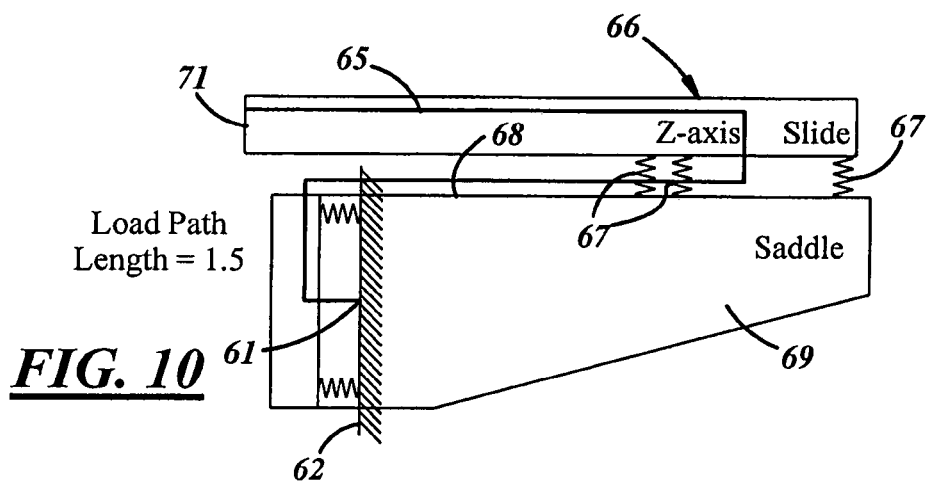

When the bearings trucks move with the Z-axis element and the ways are mounted on the supporting structure, the Z-axis element is called a slide. FIGS. 9 and 10 show the change in the load path 65 in a slide 66 when the bearings 67 are mounted on the slide 66, the ways 68 are mounted on the saddle 69, and the saddle 69 is suspended from one end. FIG. 9 shows the slide 66 fully extended in the Z-axis direction. The length of the load path 65 measured from the midpoint 61 of the suspension point for the saddle 69 on the Y-axis ways 62 to the tip 71 of the slide 66 is nominally taken to be 1.0. Although not shown, the load path length for the slide 66 at mid-stroke is 1.25. FIG. 10 shows the slide 66 fully retracted. The length of the load path 65 measured from the midpoint 61 of the suspension point for the saddle on the Y-axis ways 62 to the tip 71 of the slide is 1.5, a change of fifty percent from the length of the load path 65 shown in the configuration of FIG. 9.

Figure 11:
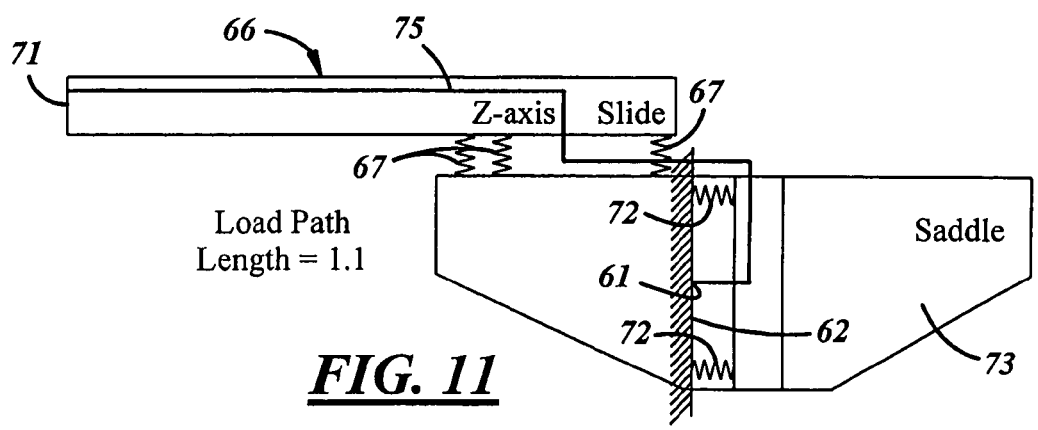
FIGS. 11 and 12 are graphical drawings showing a suspension system for a Z axis slide with a middle mounted saddle and the resulting load path.
Figure 12:
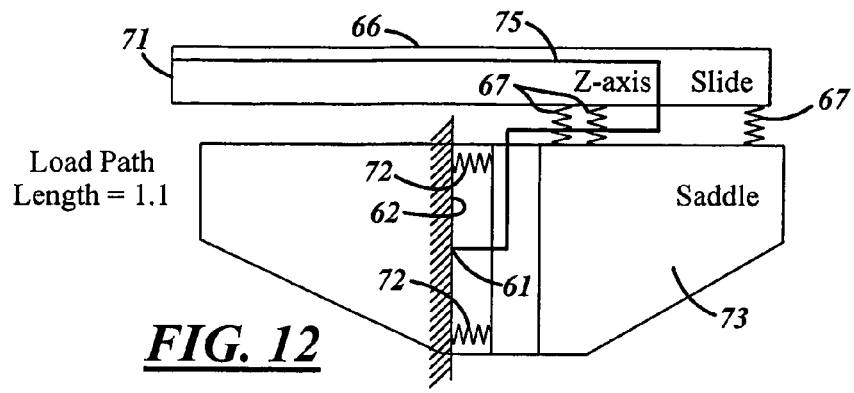

FIGS. 11 and 12 show the change in the load path for a Z-axis slide 66 in another suspension arrangement in which the bearings 72 for mounting the saddle 73 to the Y-axis ways 62 are positioned in the center of the saddle 73 instead of at one end. FIG. 11 shows the slide 66 fully extended in the Z-axis direction. The length of the load path 75 measured from the midpoint 61 of the suspension point for the saddle on the Y-axis ways 62 to the tip 71 of the slide is nominally taken to be 1.1. Although not shown, the load path length for the slide at mid-stroke is 0.9. FIG. 12 shows the slide 66 fully retracted. The length of the load path 75 measured from the midpoint 61 of the suspension point for the saddle on the Y-axis ways to the tip 71 of the ram is 1.1, the same as the load path length shown in FIG. 11.

Figure 13:
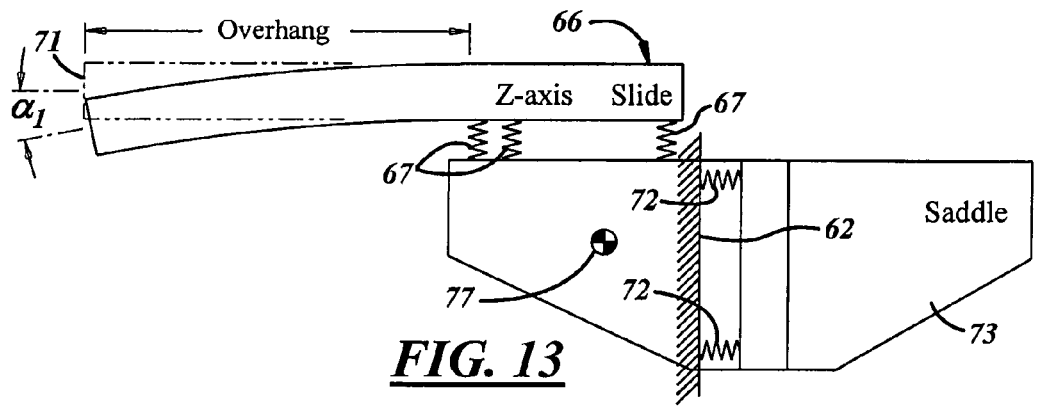
FIGS. 13 and 14 are graphical drawings showing the C-axis droop for the Z-axis slide of FIGS. 11 and 12.
Figure 14:
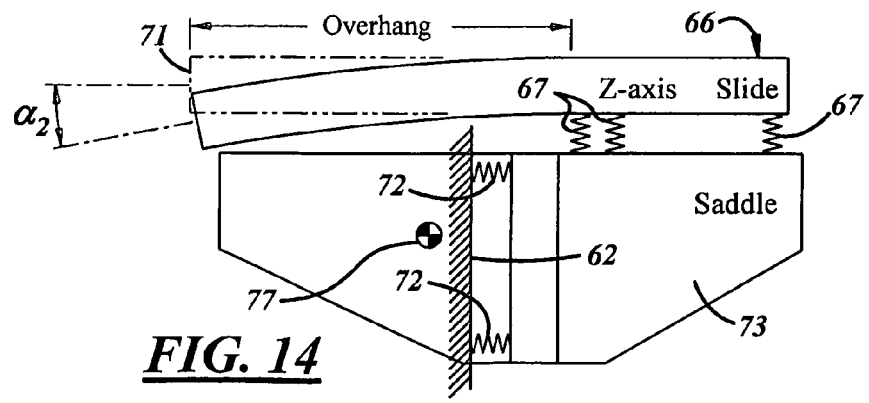

FIGS. 13 and 14 show how the angle of the C-axis changes as the load path changes with the suspension arrangement shown in FIGS. 11 and 12. A comparison of FIGS. 13 and 14 shows that the overhang of the slide 66 remains constant as the slide moves from a fully extended to a fully retracted position on the saddle 73, and as a result, angles $\alpha_1$, and $\alpha_2$ are substantially the same with the slide 66 in the two positions.

A comparison of the change in the load path length in the examples shown in FIGS. 5, 9, and 11 shows that the load path changes the least with the suspension arrangement shown in FIGS. 11-14. It will be appreciated by those skilled in the art that minimizing the change in length of the load path minimizes the change in the angle of the C-axis of the working tool, thus increasing the consistency of the rigidity of the tool, and improving the mechanical accuracy that can be maintained by the tool over its range of operation.

Because of the fixed overhang of the Z-slide design as shown in FIGS. 13 and 14, the drives, bearings and external linear feedback for the Y-axis servo system can be positioned behind and near the center of gravity 77 of the saddle 73 and the Z-axis slide structure throughout the stroke of the Z-axis slide 66. This keeps the center of gravity of the Y-axis moving mass as close as possible to the Y-axis drive screws 29 and Y-axis ways 34 to minimize twisting moments in the saddle structure caused by acceleration forces in the Y-axis direction. The fixed overhang of the Z-axis slide 66 also minimizes variation in length of the load path 75 throughout the Z-axis stroke as shown in FIGS. 11 and 12. The load path length variation is roughly proportional to the stiffness variation. This location of the Y-axis supporting elements for the saddle also allows the Y-axis column structure 25 in the preferred configuration to be placed in front of the Y-axis drive components 28, 29, and 31, the Y-axis ways 49, and feedback systems. This in turn allows the maintenance removal of the entire saddle, the Y-axis drives, the Y-axis ways and linear feedback from the outside of the workzone, greatly improving maintainability of the systems. Furthermore, the location of these elements on the side of the Y-axis column that is opposite the workzone also makes these sensitive systems less likely to be contaminated by chips and cutting fluids from the workzone.

Having thus described the invention, various alterations and modifications may be apparent to those skilled in the art, which modifications and alterations are to be considered to be within the scope of the invention as defined by the appended claims.

I claim:

1. A rigid design for a machine tool having perpendicular X, Y, and Z axes, comprising:
   fixed X-axis frame members;
   a vertical fixed X-axis wall supported by the X-axis frame members for supporting a workpiece thereon for movement in the X-axis direction;
   an immovable fixed bifurcated Y-axis column having a center opening;
   a saddle mounted in the center opening of the Y-axis column;
   a spindle mounted on the saddle for Z-axis motion in a longitudinal direction of the spindle and perpendicular to a longitudinal face of the X-axis wall; and,
   rigid structural members connecting the top and bottom of the x-axis frame members to the top and bottom of the fixed Y-axis column, respectively, whereby the X-axis frame members, the Y-axis column, and the rigid structural members form a closed force loop design.

2. The machine tool design of claim 1 further comprising:
   a Z-axis slide mounted on the saddle;
   slide bearings supporting the Z-axis slide on the saddle; and,
   bearing ways for receiving the slide bearings, wherein the slide bearings are mounted on the slide and the bearing ways are mounted on the saddle.

3. The machine tool design of claim 2 further comprising:
   saddle bearings for mounting the saddle to the Y-axis column, wherein the saddle bearings are located at approximately the middle of the saddle measured in the Z-axis direction, whereby the load path for the Z-axis slide remains relatively constant throughout the stroke of the slide.

4. The machine tool design of claim 2 further comprising:
   drive elements for moving the saddle along the Y-axis, whereby the drive elements are located at approximately the middle of the saddle measured in the Z-axis direction.

5. The machine tool design of claim 4 further comprising:
   a working tool coupled to the spindle, the working tool establishing a workzone; and,
   Y-axis drive screws and Y-axis motors coupled to the Y-axis drive screws comprising the drive elements for moving the saddle along the Y-axis, the drive elements being located on the opposite side of the column from the workzone.

6. The machine tool design of claim 5 further comprising:
   drive nuts on either side of the saddle, wherein the drive screws are coupled to the drive nuts and the drive screws are located on either side of the center opening of the Y-axis column.

7. The machine tool design of claim 6 further comprising saddle bearings for mounting the saddle to the Y-axis column, whereby the saddle bearings are located at approximately the middle of the saddle measured in the Z-axis direction.

8. The machine tool of claim 6 wherein the center of mass of the slide and the saddle is located in approximate alignment with the drive screws, whereby twisting moments in the saddle caused by acceleration forces in the Y-axis direction are kept to a minimum.

9. The machine tool of claim 2 wherein the overhang of the slide measured from the tip of the slide to the slide bearings does not change as the slide moves from a fully extended to a fully retracted position on the saddle.

10. The machine tool design of claim 1 further comprising saddle bearings for mounting the saddle to the Y-axis column, whereby the saddle-bearings are located at approximately the middle of the saddle measured in the Z-axis direction.

* * * * *